(12) United States Patent
Turner

(10) Patent No.: US 11,364,559 B2
(45) Date of Patent: *Jun. 21, 2022

(54) HOLE SAW

(71) Applicant: Mark Turner, Arlington, TX (US)

(72) Inventor: Mark Turner, Arlington, TX (US)

( * ) Notice: Subject to any disclaimer, the term of this patent is extended or adjusted under 35 U.S.C. 154(b) by 78 days.

This patent is subject to a terminal disclaimer.

(21) Appl. No.: 16/905,647

(22) Filed: Jun. 18, 2020

(65) Prior Publication Data

US 2020/0316698 A1    Oct. 8, 2020

Related U.S. Application Data

(63) Continuation of application No. 16/141,756, filed on Sep. 25, 2018, now Pat. No. 10,688,573, which is a continuation of application No. 15/066,163, filed on Mar. 10, 2016, now abandoned.

(60) Provisional application No. 62/262,813, filed on Dec. 3, 2015.

(51) Int. Cl.
| | |
|---|---|
| *B23D 49/11* | (2006.01) |
| *B23D 61/00* | (2006.01) |
| *B23D 61/18* | (2006.01) |
| *B27B 19/00* | (2006.01) |
| *B23D 49/00* | (2006.01) |

(52) U.S. Cl.
CPC ............ *B23D 49/11* (2013.01); *B23D 49/003* (2013.01); *B23D 61/006* (2013.01); *B23D 61/18* (2013.01); *B27B 19/008* (2013.01)

(58) Field of Classification Search
CPC .... B23D 49/11; B23D 61/006; B23D 49/003; B23D 49/005; B23D 49/006; B23D 61/18; B23D 49/14; Y10T 83/9319; B27B 19/006; B27B 19/008; B24D 5/123
USPC .................... 30/166.3, 501, 502, 503, 503.5; D15/139; D8/70

See application file for complete search history.

(56) References Cited

U.S. PATENT DOCUMENTS

| | | | |
|---|---|---|---|
| 803,368 | A | 10/1905 | Smith |
| 2,482,439 | A | 9/1949 | Smith |
| 3,470,923 | A | 10/1969 | Besthome |
| 3,503,294 | A | 3/1970 | Vinciguerra et al. |
| 3,554,197 | A | 1/1971 | Dobbie |
| 3,706,474 | A | 12/1972 | Neuenburg |
| 3,837,230 | A | 9/1974 | Neuenburg |

(Continued)

FOREIGN PATENT DOCUMENTS

| | | |
|---|---|---|
| DE | 433119 | 8/1926 |
| DE | 574898 | 4/1933 |

(Continued)

*Primary Examiner* — Evan H Macfarlane
(74) *Attorney, Agent, or Firm* — James L. Baudino

(57) ABSTRACT

A hole saw includes a base member configured to secure the hole saw to a drive device and a plurality of blade members where each blade member is connected to and disposed orthogonally to the base member via a respective extender. Each blade member has cutting teeth extending in a respective cutting direction and distances between the cutting teeth and the base member vary along the respective cutting direction of the respective blade members. Each respective extender is configured cantilever support opposite, freestanding distal ends of the respective blade member where each distal end of each respective blade member is disconnected from the distal end of an adjacent blade member.

8 Claims, 12 Drawing Sheets

(56) References Cited

U.S. PATENT DOCUMENTS

| | | | |
|---|---|---|---|
| 4,147,464 A | 4/1979 | Watson et al. | |
| 4,760,643 A | 8/1988 | Juma | |
| H571 H | 2/1989 | Hollinger et al. | |
| 5,014,430 A | 5/1991 | Wortham | |
| 5,048,190 A | 9/1991 | Aumess et al. | |
| 5,092,869 A | 3/1992 | Waldron | |
| 5,456,011 A | 10/1995 | Inkster | |
| 5,468,247 A | 11/1995 | Matthai et al. | |
| 5,651,646 A | 7/1997 | Banke et al. | |
| 5,697,835 A | 12/1997 | Nitz et al. | |
| D391,974 S | 3/1998 | Brutscher | |
| D392,297 S | 3/1998 | Brutscher | |
| 5,797,189 A | 8/1998 | Gilbert | |
| 5,860,218 A | 1/1999 | Vinciguerra | |
| 5,867,913 A | 2/1999 | Pettigrew | |
| D406,223 S | 3/1999 | Tran | |
| D438,219 S | 2/2001 | Brutscher | |
| 6,283,843 B1 | 9/2001 | Romagnoli | |
| 6,681,756 B1 | 1/2004 | Kilpatrick | |
| 7,667,136 B2 | 2/2010 | Dinh et al. | |
| D639,833 S | 6/2011 | Inkster | |
| D681,081 S | 4/2013 | Neal, Jr. et al. | |
| D681,082 S | 4/2013 | Neal, Jr. et al. | |
| 8,568,204 B2 | 10/2013 | Steiger et al. | |
| D727,380 S | 4/2015 | Zhang et al. | |
| 9,358,623 B2 | 6/2016 | Burks et al. | |
| 10,688,573 B2 * | 6/2020 | Turner | B23D 49/11 |
| 2001/0041524 A1 * | 11/2001 | Steiger | B23D 61/006 |
| | | | 451/356 |
| 2012/0125171 A1 | 5/2012 | Chen et al. | |
| 2012/0198709 A1 | 8/2012 | Inkster | |
| 2014/0190328 A1 * | 7/2014 | Karlen | B23D 65/00 |
| | | | 83/853 |
| 2014/0224091 A1 | 8/2014 | Sebhatu | |
| 2014/0338513 A1 | 11/2014 | Burks et al. | |
| 2015/0165633 A1 | 6/2015 | Padget | |
| 2015/0343539 A1 | 12/2015 | Hoop | |
| 2016/0279716 A1 | 9/2016 | Gamboa Arias | |
| 2017/0001252 A1 | 1/2017 | Caroprese | |
| 2017/0157688 A1 | 6/2017 | Turner | |

FOREIGN PATENT DOCUMENTS

| | | |
|---|---|---|
| DE | 2120077 | 11/1972 |
| DE | 2535112 | 2/1977 |
| DE | 3940743 | 6/1991 |
| DE | 4036904 | 5/1992 |
| DE | 4425456 | 3/1996 |
| DE | 29604965 | 6/1996 |
| EP | 0881023 | 12/1998 |
| EP | 1240872 | 9/2002 |
| EP | 2987577 | 2/2016 |
| FR | 604454 | 5/1926 |
| FR | 1412153 | 9/1965 |
| FR | 2704790 | 11/1994 |
| JP | 04269117 | 9/1992 |
| JP | 2000107919 | 4/2000 |
| JP | 2010247306 | 11/2010 |
| WO | 2007049012 | 5/2007 |
| WO | 2007086767 | 8/2007 |
| WO | 2008061835 | 5/2008 |
| WO | 2013113432 | 8/2013 |

* cited by examiner

HOLE SAW

BACKGROUND

Hole saws are generally used to make cut-outs, holes and/or openings in materials such as wood, fiberglass, plastic, drywall, etc. Holes saws are generally used with a power drill or other type of rotary power drive unit. Hole saws typically include a saw cup, an arbor and a pilot bit. The saw cup includes a threaded portion to receive a threaded end portion of the arbor. The pilot bit protrudes from the cutting edge of the saw to guide the saw during cutting. The arbor is generally inserted into a chuck of the power drill. The saw body is coupled to the pilot bit for rotation with the pilot bit, and the saw body includes a collection of teeth to form a cutting edge. In operation, the power drill causes rotation of the hole saw, and the drill bit first cuts into a structure to establish a pilot hole to maintain the hole saw concentric to a particular point. The cutting edge of the saw body then cuts a relatively larger opening in the structure.

BRIEF SUMMARY

According to one aspect of the present disclosure, a hole saw saw is disclosed. The hole saw includes a planar base member configured to secure the hole saw to a drive device and a plurality of blade members. Each blade member extends orthogonally from a respective side of the base member, and each blade member has cutting teeth extending in a longitudinal cutting direction of the respective blade member. Each blade member is attached to the base member in a fixed position relative to the base member, and each blade member has oppositely extending, freestanding distal ends. Each blade member is configured to have the respective distal ends of the respective blade member flex transversely to the longitudinal cutting direction of the respective blade member, and wherein an edge of each blade member having the respective cutting teeth extends linearly downward toward the base member as the edge extends toward the respective distal ends. Responsive to rotational movement of the hole saw via the drive device against a structure, a medial location of each blade member creates an initial respective linear cutting path into the structure, and wherein responsive to further movement of the respective blade members into the structure, the distal ends of the respective blade members flex transversely to the longitudinal cutting direction to follow the initial linear cutting path of the respective blade member despite the rotational movement of the hole saw relative to the structure to produce a respective linear cut through the structure corresponding to a length of the respective blade member in the longitudinal cutting direction of the respective blade member.

According to another embodiment of the present disclosure, a hole saw includes a base member configured to secure the hole saw to a drive device and a plurality of blade members where each blade member is connected to and disposed orthogonally to the base member via a respective extender. Each blade member has cutting teeth extending in a respective cutting direction and distances between the cutting teeth and the base member vary along the respective cutting direction of the respective blade members. Each respective extender is configured cantilever support opposite, freestanding distal ends of the respective blade member where each distal end of each respective blade member is disconnected from the distal end of an adjacent blade member.

According to another embodiment of the present disclosure, a hole saw includes a base member and a set of blade members disposed orthogonally to the base member. Each blade member is attached to the base member in a fixed position relative to the base member, and each blade member has an edge with cutting teeth extending in a respective longitudinal direction to a cutting length of a respective one of the blade members. Each blade member has oppositely disposed distal ends, and wherein the distal ends of each blade member are disconnected from the distal ends of a respective blade member of the set and are configured to flex transversely relative to the respective longitudinal direction of the respective blade member. The base member is configured to be coupled to a drive device, and wherein each blade member includes a stabilizer extending along a length of a respective side of the base member and an extender extending from the stabilizer toward the cutting teeth of the respective blade member, the extender having a length in the respective longitudinal direction of the respective blade member less than the respective cutting length.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Embodiments of the present disclosure provide a hole saw that may be used to form a variety of sizes and/or shapes of holes and/or openings in a structure. According to one embodiment, a hole saw includes a base member configured to secure the hole saw to a drive device; and a set of blade members extending from the base member, each blade member including a sawing portion having cutting teeth, the sawing portion having a medial portion connected to the base member, the sawing portion having oppositely extending, freestanding distal ends. In some embodiments, the hole saw may be attached to an oscillating power tool or oscillating drive device. The oscillating drive device vibrates the hole saw back and forth in a narrow arc (e.g., approximately 3°-4°) and causes the hole saw to create an opening in a structure corresponding to the locations/orientations of the blade members relative to each other.

Figure 1:
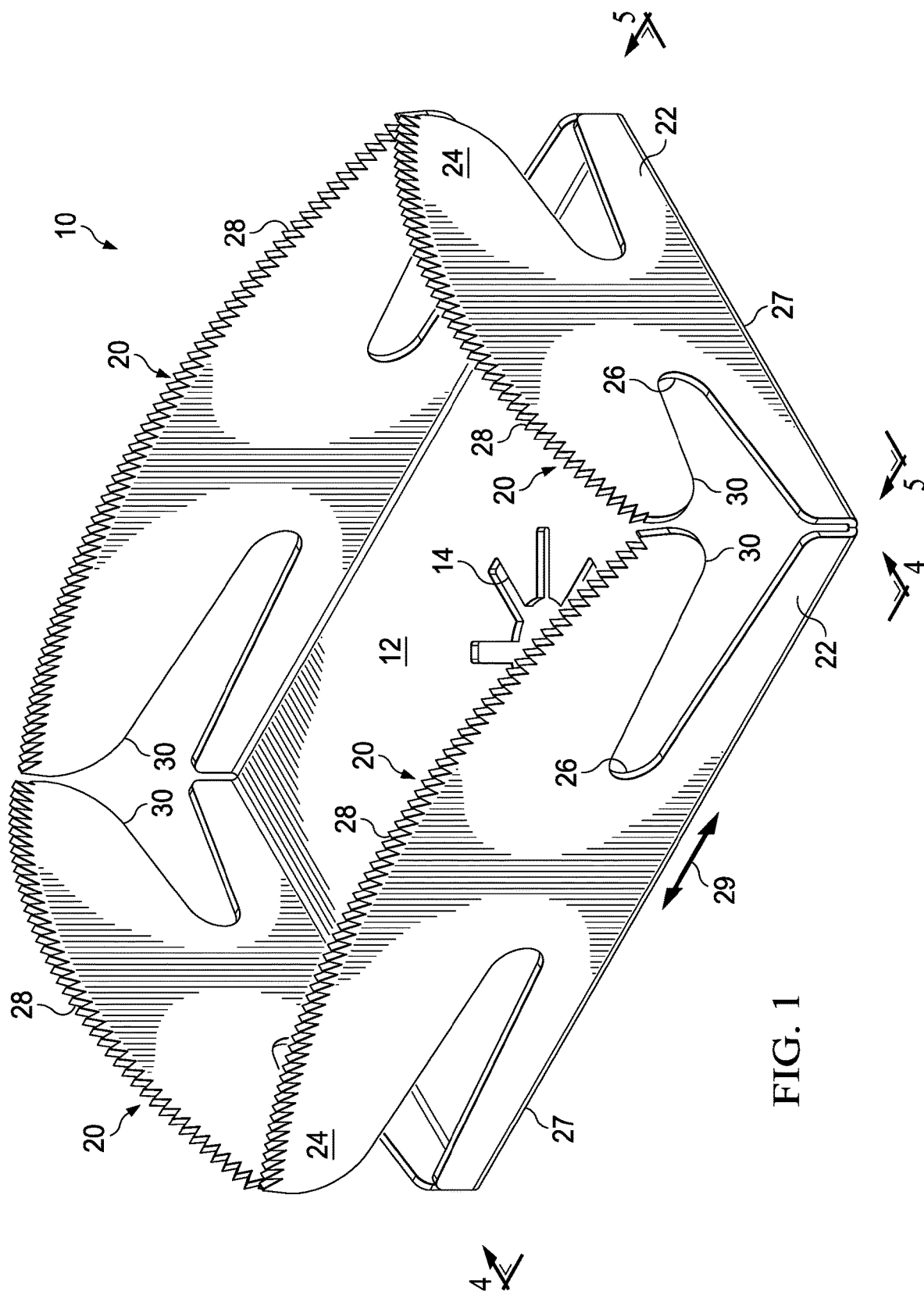
FIG. 1 is a diagram illustrating a top perspective view of a hole saw according to the present disclosure.
Figure 2:
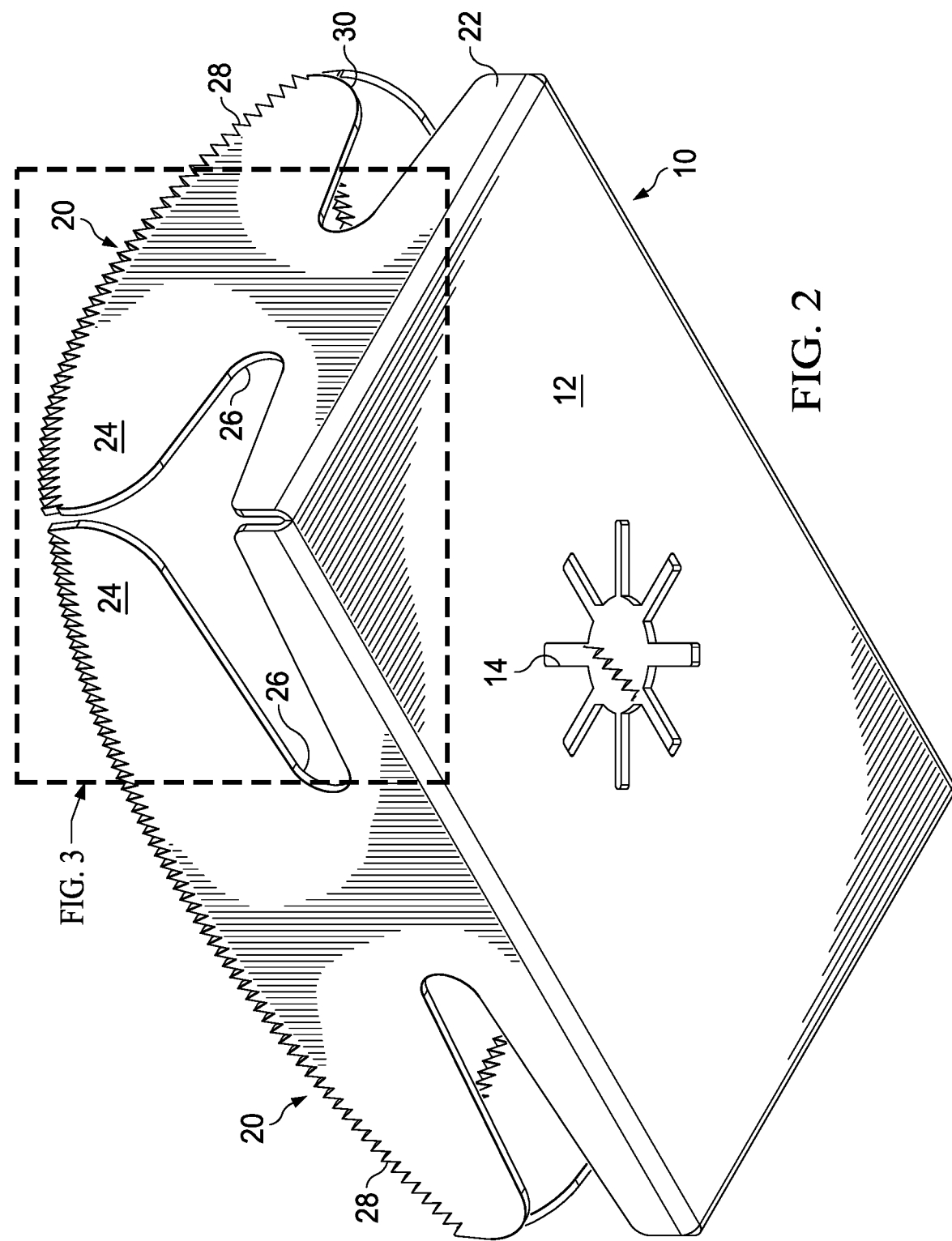
FIG. 2 is a diagram illustrating a bottom perspective view of the hole saw of FIG. 1 according to the present disclosure.
Figure 3:
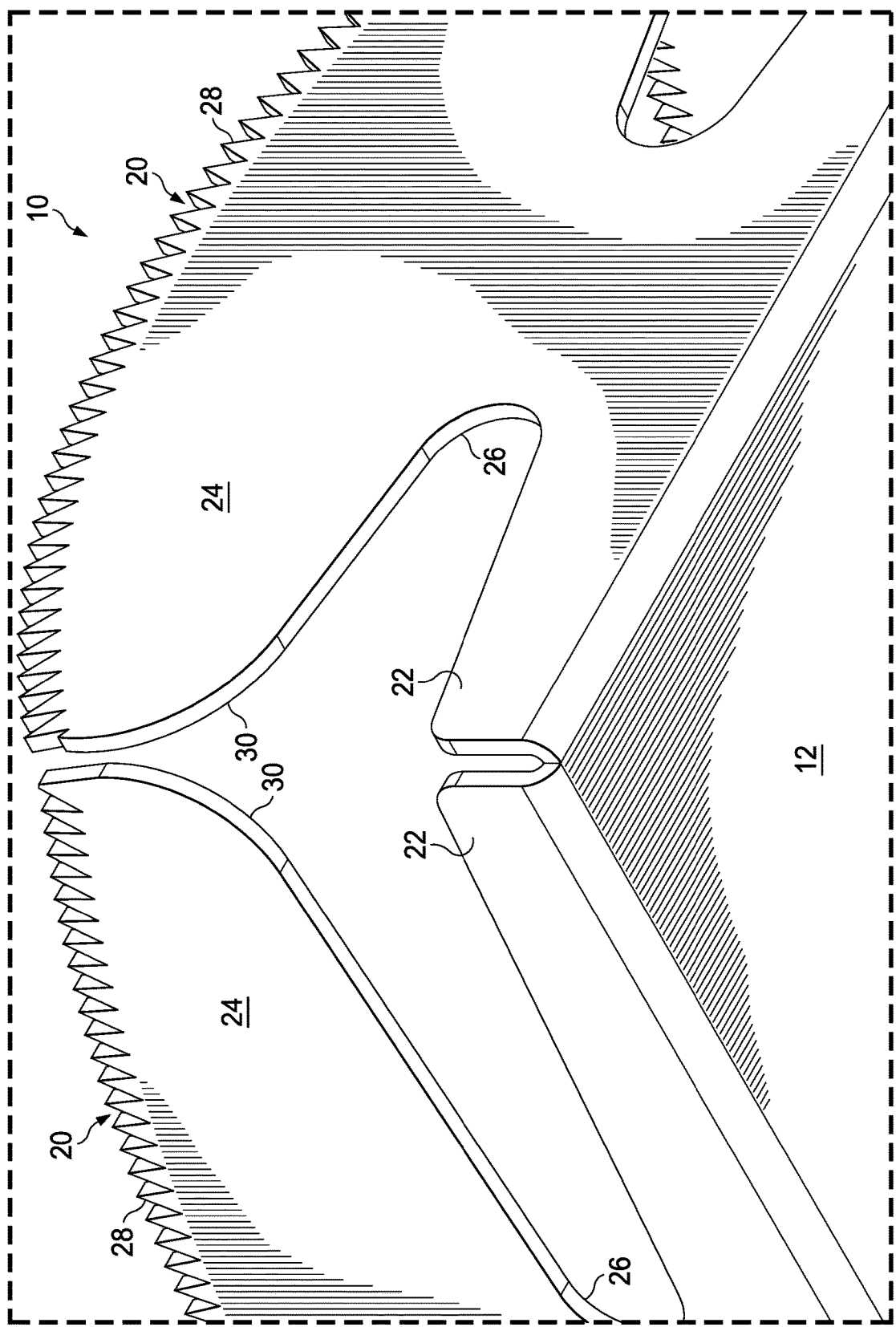
FIG. 3 is a diagram illustrating an enlarged view of a portion of the hole saw of FIG. 2 according to the present disclosure.
Figure 4:
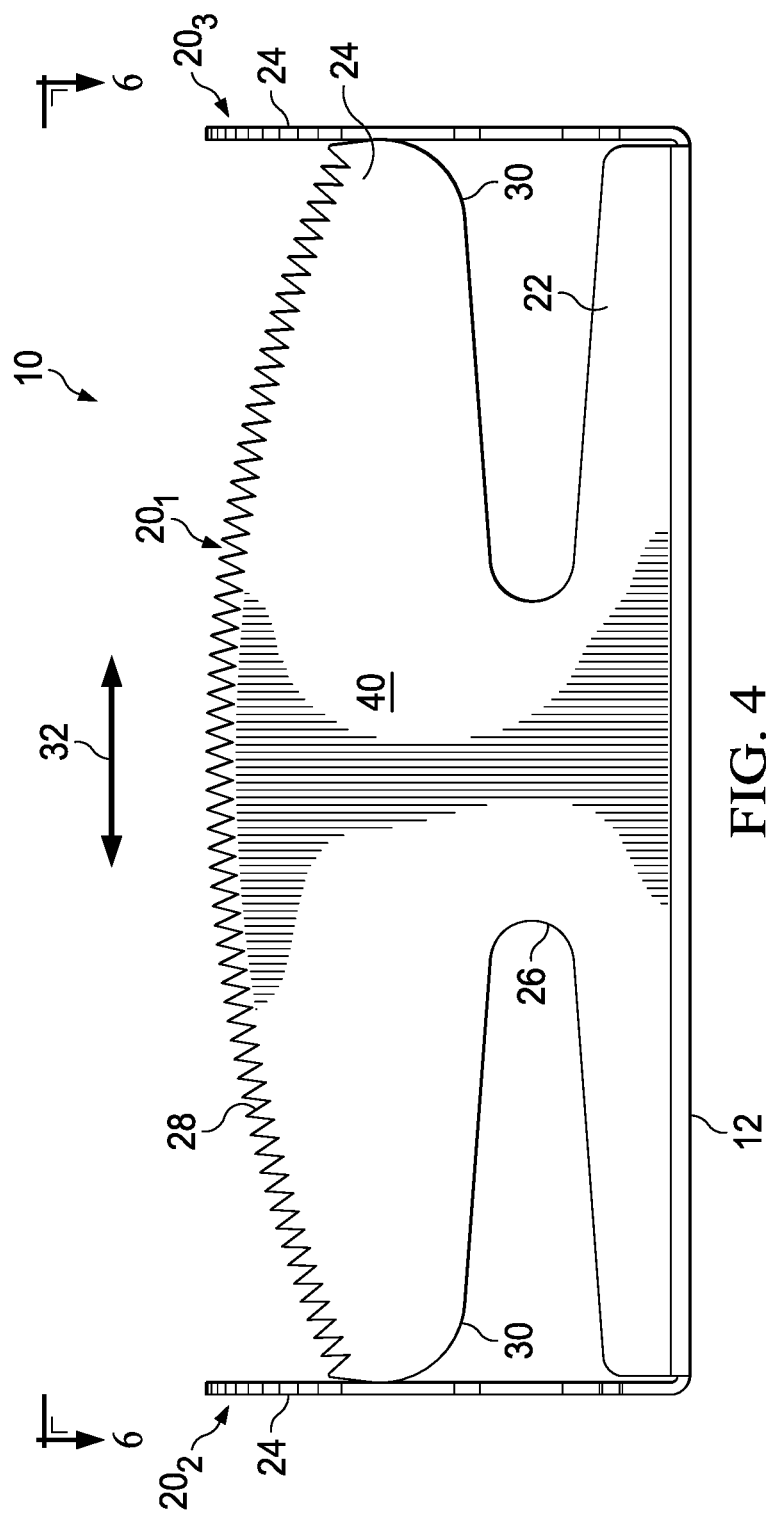
FIG. 4 is a diagram illustrating a view of the hole saw of FIG. 1 taken from the line 4-4 of FIG. 1.
Figure 5:
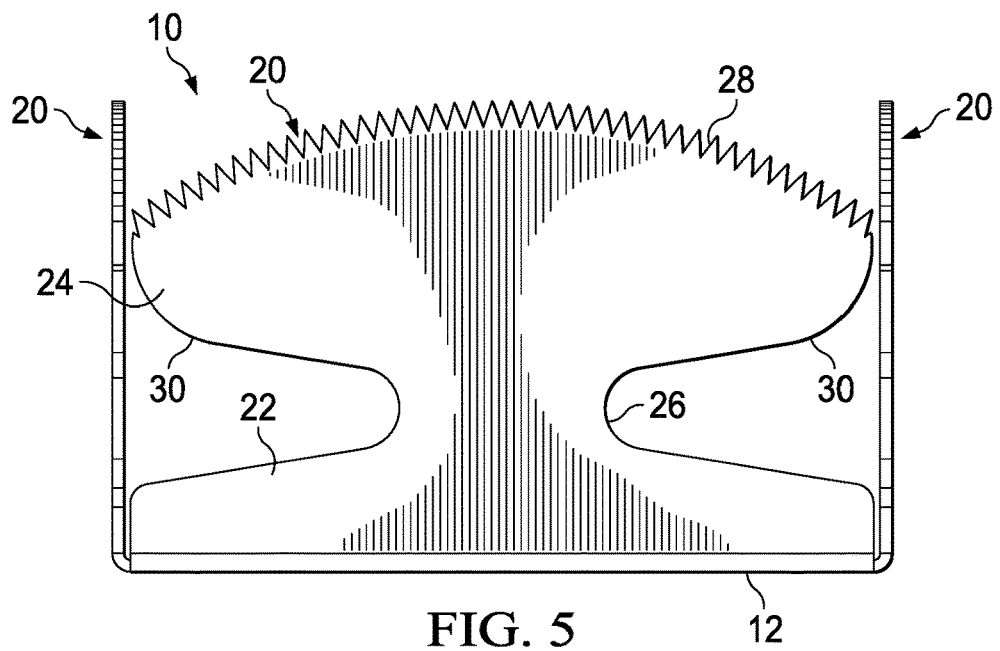
FIG. 5 is a diagram illustrating a view of the hole saw of FIG. 1 taken from the line 5-5 of FIG. 1.
Figure 6:
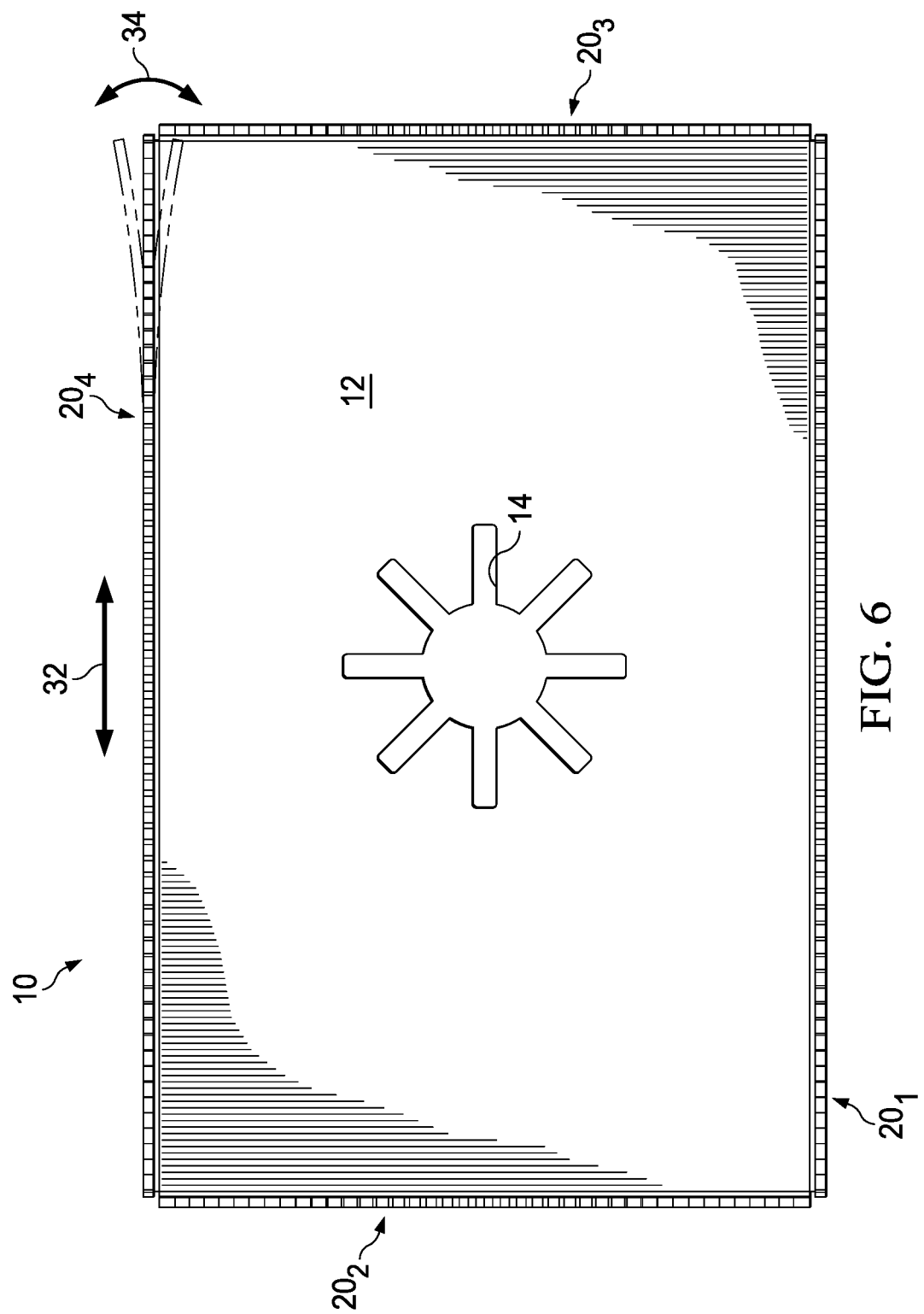
FIG. 6 is a diagram illustrating a top view of the hole saw of FIG. 1 taken from the line 6-6 of FIG. 4.

With reference now to the Figures and in particular with reference to FIGS. 1-6, diagrams illustrating a hole saw 10 according to the present disclosure is illustrated. FIG. 1 is a diagram illustrating a top perspective view of hole saw 10 according to the present disclosure; FIG. 2 is a diagram illustrating a bottom perspective view of hole saw 10 of FIG. 1 according to the present disclosure; FIG. 3 is a diagram illustrating an enlarged view of a portion of hole saw 10 of FIG. 2 according to the present disclosure; FIG. 4 is a diagram illustrating a view of hole saw 10 of FIG. 1 taken from the line 4-4 of FIG. 1; FIG. 5 is a diagram illustrating a view of hole saw 10 of FIG. 1 taken from the line 5-5 of FIG. 1; and FIG. 6 is a diagram illustrating a top view of hole saw 10 of FIG. 1 taken from the line 6-6 of FIG. 4.

In the illustrated embodiment, hole saw 10 is configured to create a rectangular opening in a wall or other structure. However, it should be understood that hole saw 10 may be differently configured to create other sizes and/or shapes of openings (e.g., triangular, hexagonal, octagonal, etc.) based on the locations and/or orientations of the cutting blades of hole saw 10 relative to each other, as described in further detail below.

In the illustrated embodiment, hole saw 10 includes a base member 12 for securing hole saw 10 to a drive device (e.g., an oscillating drive device capable of vibrating and/or moving hole saw 10 back and forth in a narrow arc (e.g., approximately 3°-4°)). For example, in some embodiments, hole saw 10 is releasably securable to a drive device such as an oscillating power tool. In the illustrated embodiment, base member 12 includes an opening 14 configured to enable the releasable attachment of hole saw 10 to such drive device. It should be understood that hole saw 10 and/or base member 12 may be otherwise configured to facilitate attachment to different types of drive devices. Also, it should be understood that hole saw 10 may be configured as a permanent and/or non-removable component of a drive device.

In the illustrated embodiment, hole saw 10 includes a number or set of blade members 20 extending upwardly from base member 12 (e.g., away from the drive device and toward a wall/structure in which an opening is desired). Blade members 20 are located and/or positioned relative to base member 12 to provide a desired size and/or shape of opening in a wall/structure. For example, in the illustrated embodiment, hole saw 10 includes four blade members 20, and each located and extending upwardly at an approximate right angle from a different side of base member 12. However, it should be understood that blade members 20 may be at different angles relative to base member 12 (e.g., to produce a tapered plug having slanted/angled cuts through a structure). In the illustrated embodiment, each blade member 20 is positioned at approximately a right angle (or orthogonally) relative to an adjacent blade member 20 to enable the creation of a rectangular opening in a wall/structure. However, as described above, the number of blade members 20 and/or positions relative to each other may be varied to create a different size/shape opening in a structure (e.g., three blade members 20 to create a triangular opening).

In the illustrated embodiment, each blade member 20 includes a stabilizing portion 22 located near and connected to base member 12, and a sawing portion 24 connected to stabilizing portion 22 via a necked down or reduced width extender portion 26. For example, in the illustrated embodiment, stabilizing portion 22 extends substantially the entire length of a respective edge 27 of base member 12 and extends upwardly away from base member 12 to a height to provide a sufficient level of rigidity and/or stability for the respective blade member 20. As illustrated in the figures, each sawing portion 24 includes cutting teeth 28 extending along an uppermost edge of sawing portion 24 for cutting into a corresponding wall/structure. Sawing portion 24 extends a distance approximately equal to a distance of a corresponding side of a desired opening size/shape in the wall/structure.

In the illustrated embodiment, extender 26 is located approximately medially relative to a length or longitudinal distance of stabilizing portion 22 (e.g., measured in a direction indicated by 29). Sawing portion 24 extends upwardly from extender 26 and extends distally therefrom in opposite directions to have oppositely disposed (i.e., at opposite ends thereof) freestanding ends 30 (i.e., separated from and/or spaced apart from corresponding locations of stabilizing portion 22). In the illustrated embodiment, sawing portion 24 is configured to have distally located, freestanding ends 30 to enable ends 30 to be flexible to facilitate transverse movement thereof relative to a longitudinal cutting direction of sawing portion 24. For example, as best illustrated on FIGS. 4 and 6, the illustrated hole saw 10 includes four blade members 20 (blade members $20_1$, $20_2$, $20_3$ and $20_4$). For ease of description, the operation and/or movement of blade member $20_1$ will be described; however, it should be understood that the operation and/or movement described is equally applicable to blade members $20_2$-$20_4$. The cutting portion 24 of blade member $20_1$ is configured to cut into a structure along a longitudinal direction 32 (e.g., aligned with the longitudinal direction of the respective blade member 20). Free ends 30 of cutting portion 24 are spaced apart from and/or separated from proximate portions of stabilizing portion 22 to enable lateral and/or transverse movement of ends 30 relative to direction 32 (e.g., movement of ends 30 in a direction 34). For example, if a medial portion of cutting portion 24 (e.g., near extender 26) is held firmly, ends 30 may move or flex in a direction 34 relative thereto because of the unsupported nature of ends 30. It should be understood that the distal ends 30 of each blade member 20 may flex in a direction similar to direction 34 based on the respective blade member 20.

As best illustrated in FIG. 3, ends 30 of adjacent sawing portions 24 are disconnected from each other to enable independent movement thereof relative to each other. In the illustrated embodiment, ends of adjacent stabilizing portions 22 are also disconnected from each other; however, it should be understood that ends of adjacent stabilizing portions 22 may also be connected to each other to provide increased rigidity of corresponding blade members 20. It should also be understood that in some embodiments, stabilizing portion 22 may be omitted if extender 26 provides suitable strength, stiffness and/or rigidity to support cutting portion 24. Thus, in such an embodiment, ends 30 of cutting portion 24 would be spaced apart from base member 12 to enable ends 30 to move laterally/transversely relative to a longitudinal cutting direction of a respective cutting blade 20. Thus, extender 26 connects a medial portion of cutting portion 24 to stabilizing portion 22 and/or base member 12 while also being a cantilever support for freestanding or unsupported distal ends 30 of cutting portion 24.

Figure 10:
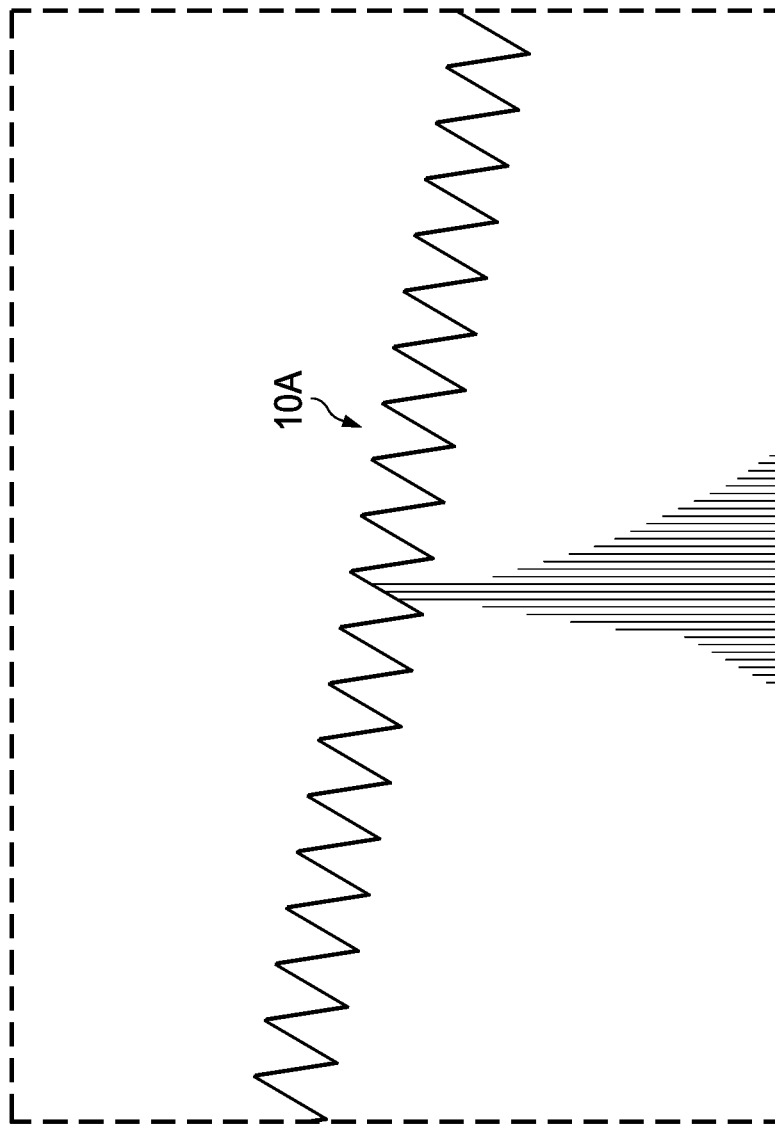
FIG. 10 is a diagram illustrating a view of another embodiment of a hole saw according to the present disclosure.

Referring to FIG. 4, cutting portion 24 is configured such that a medial portion or location 40 of cutting portion 24 extends upwardly away from base member 12 a greater distance than distal ends 30. For example, in the illustrated embodiment, the upper edge of cutting portion 24 containing teeth 28 is arcuately formed such that the upper cutting edge of cutting portion 24 curves downwardly from medial location 40 towards distal ends 30. However, it should be understood that the upper edge of cutting portion 24 may also be otherwise formed (e.g., extending linearly downward from medial location 40 toward distal ends 30 as illustrated in FIG. 10 depicting a portion of another embodiment of the present invention as hole saw 10A). Thus, a distance from base member 12 to the cutting teeth 28 is greater at medial location 40 of blade member 20 than at distal ends 30. In other words, the distance from the cutting teeth to the base 12 varies along a longitudinal length/direction of the respective cutting blade (e.g., decreasing toward the distal ends 30).

Figure 7A:
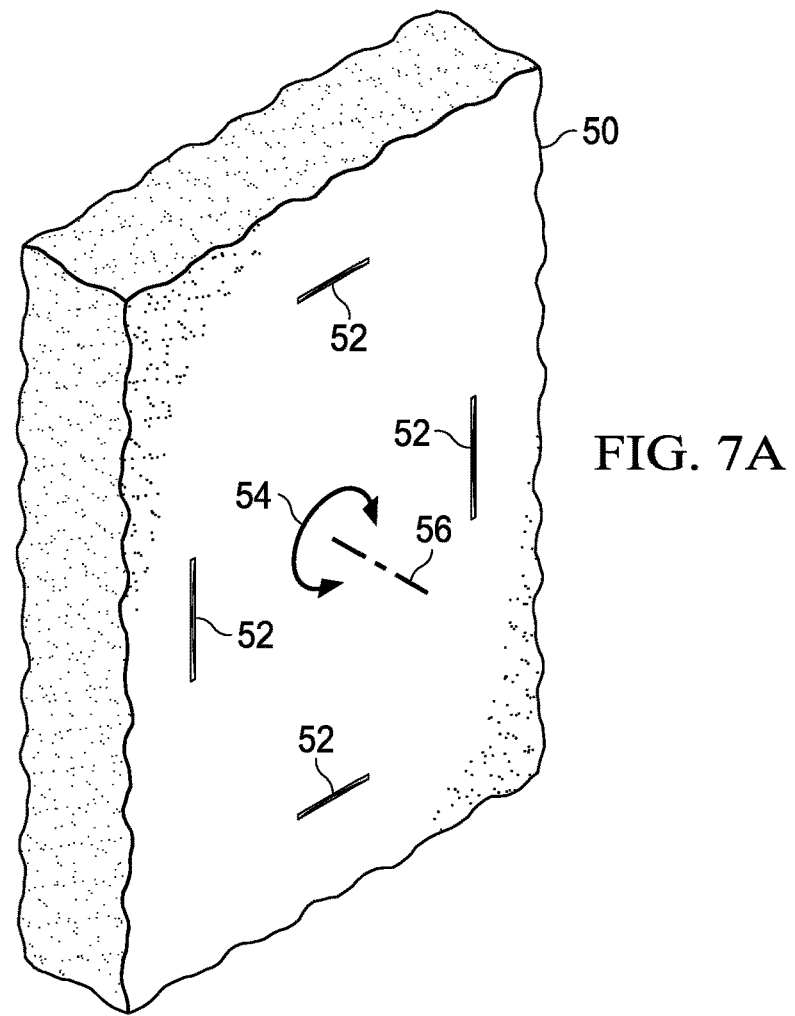
FIGS. 7A-7C are diagrams illustrating progressive stages of cuts formed in a structure during a cutting process/operation using the hole saw of FIGS. 1-6 according to the present disclosure.
Figure 7B:
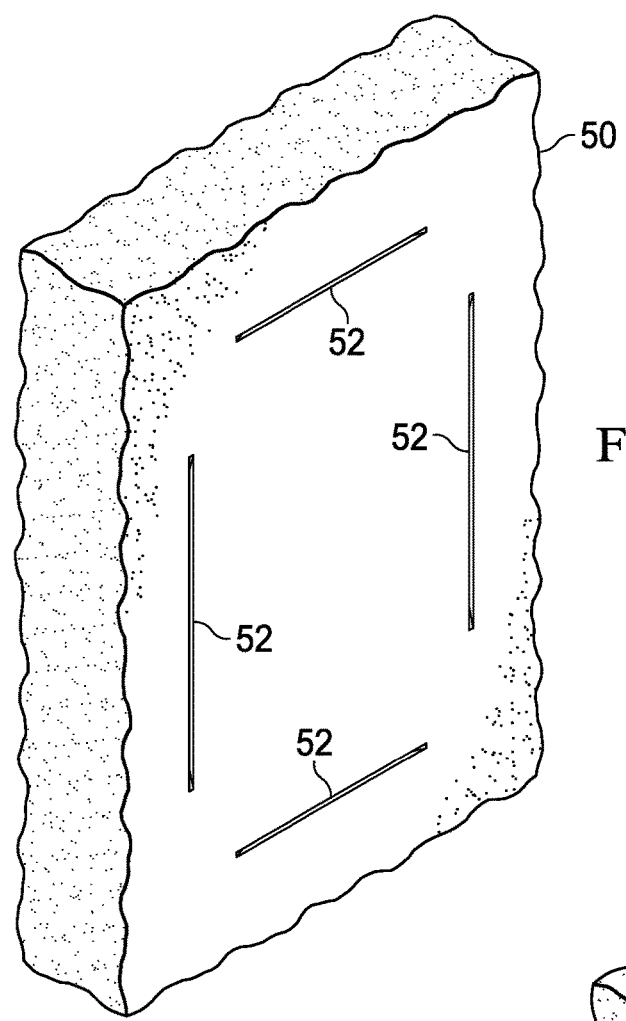
Figure 7C:
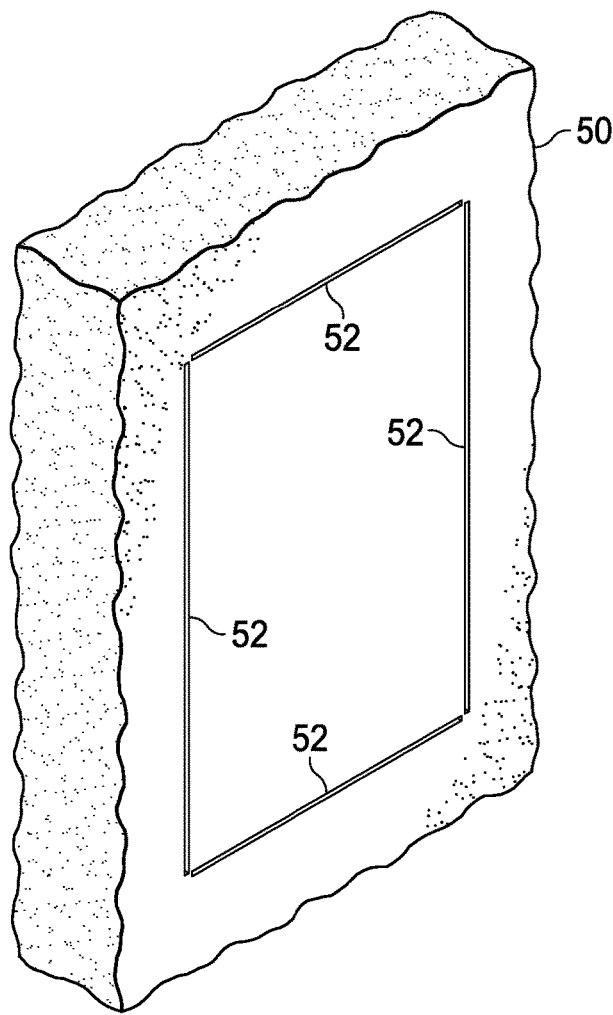
Figure 8A:
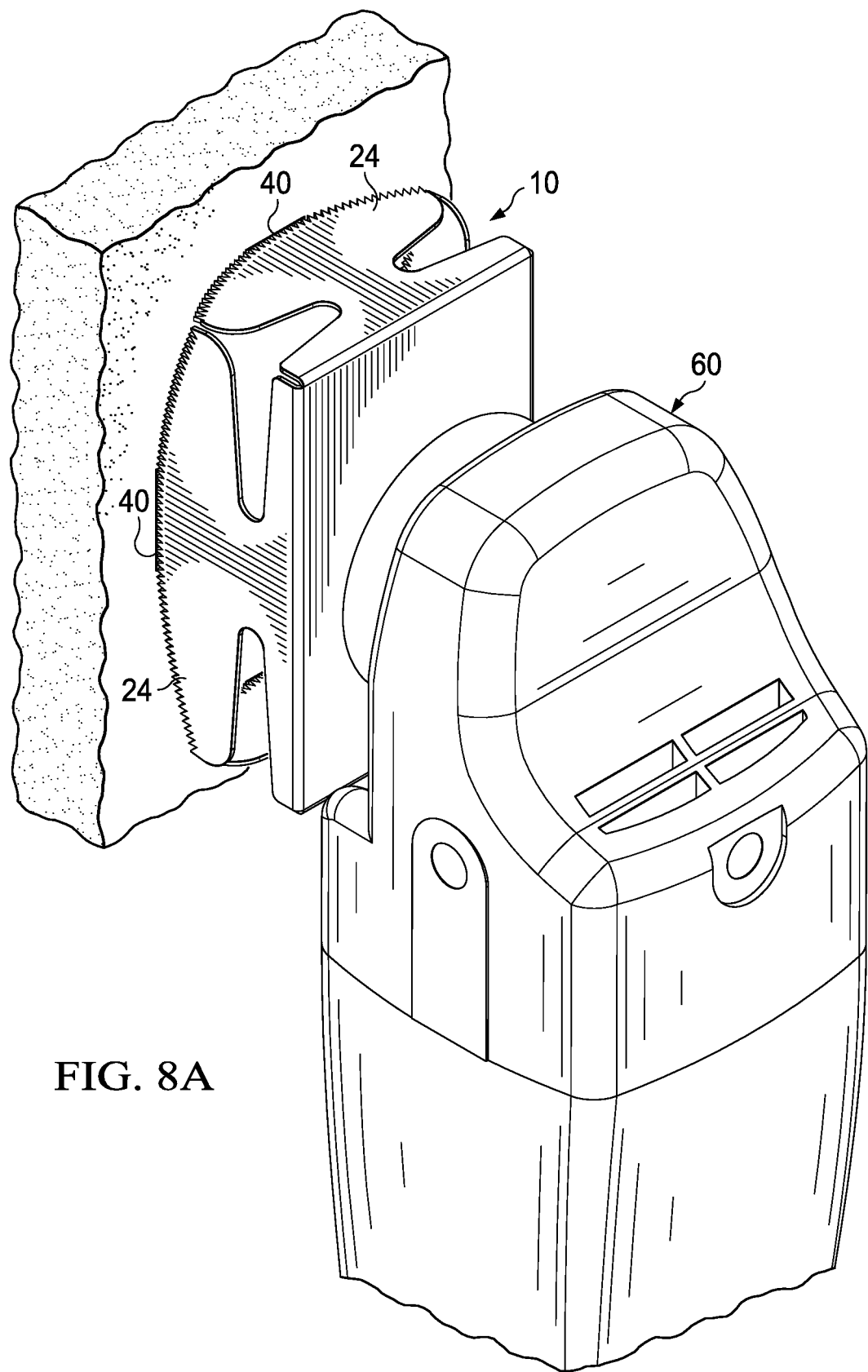
FIGS. 8A-8C are diagrams illustrating the hole saw of FIG. 1-6 attached to a drive device and performing the cutting process/operation depicted in FIGS. 7A-7C.
Figure 8B:
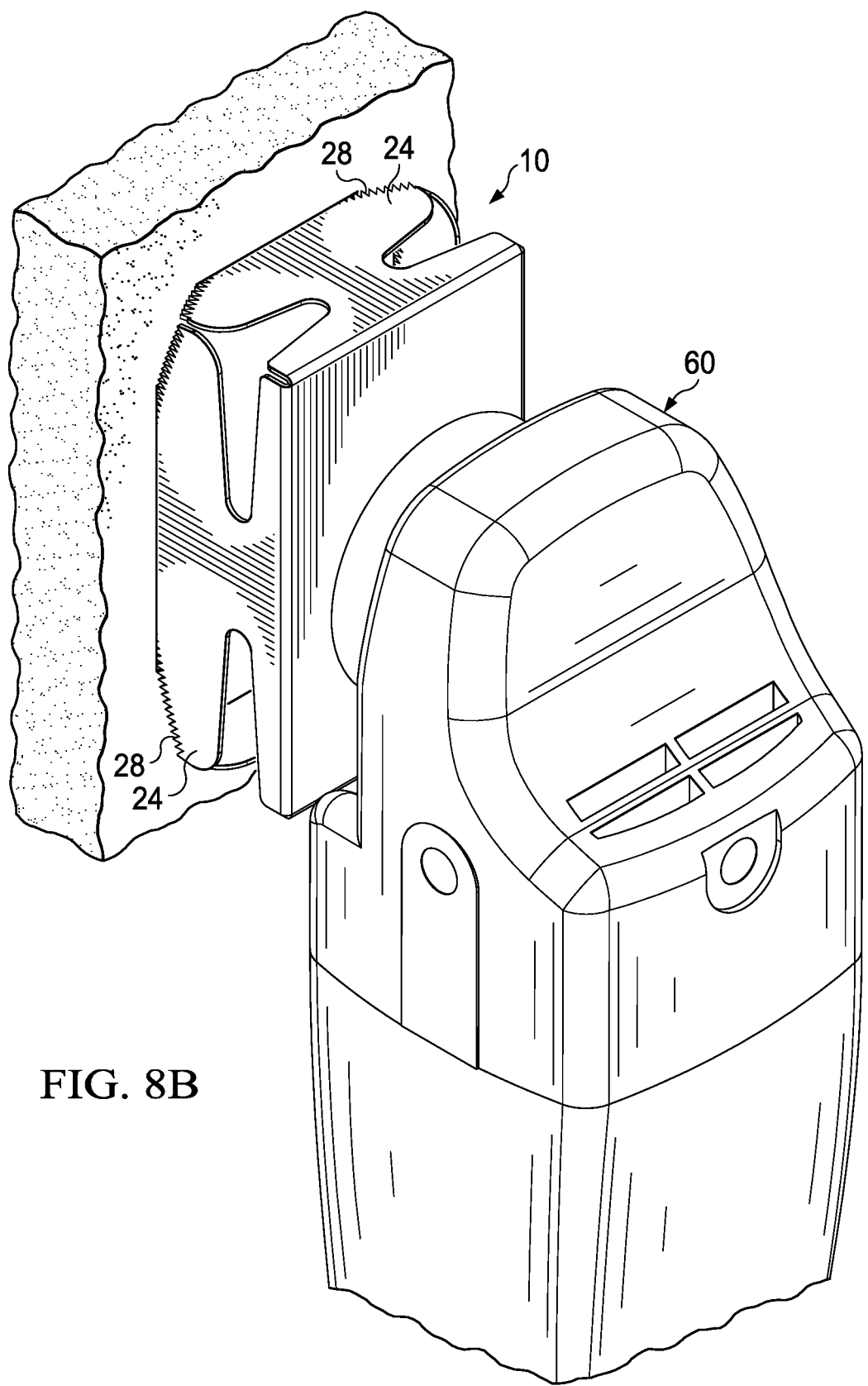
Figure 8C:
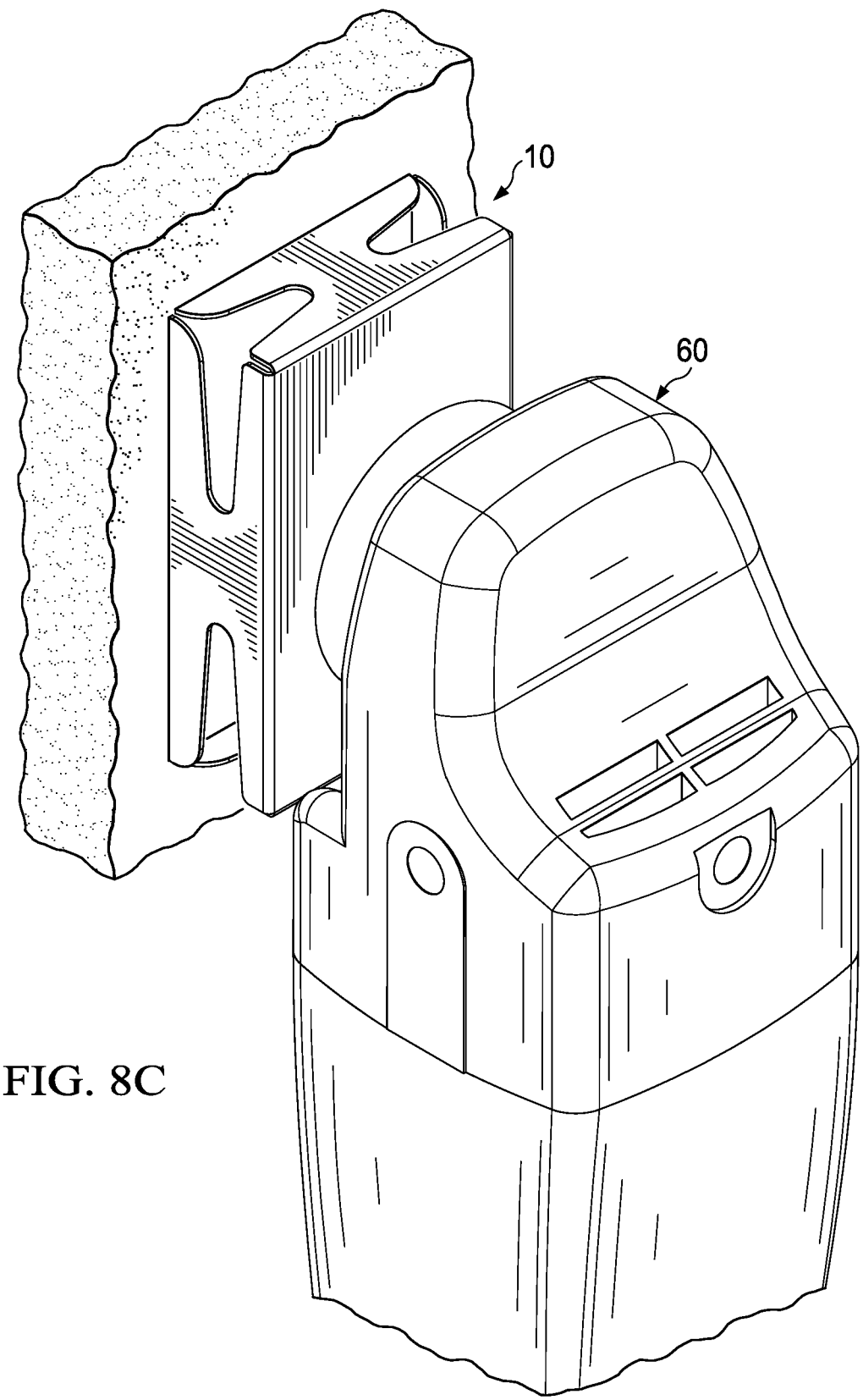
Figure 9:
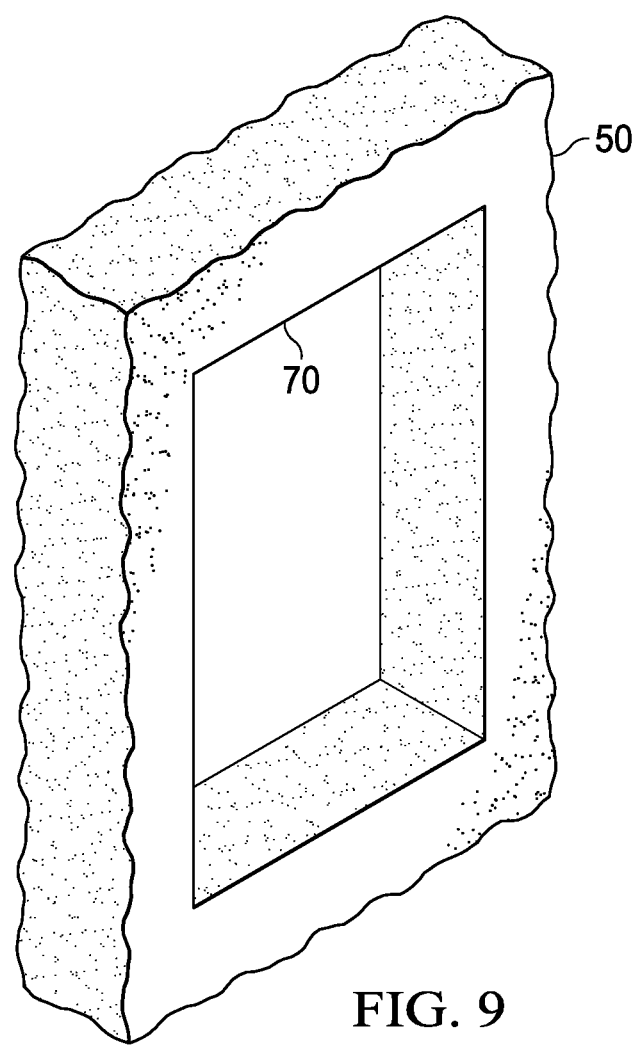
FIG. 9 is a diagram illustrating a hole formed in a structure using the hole saw of FIG. 1-6 resulting from the cutting process/operation depicted in FIGS. 7A-7C and 8A-8C according to the present disclosure.

FIGS. 7A-7C are diagrams illustrating progressive stages of cuts formed in a structure during 50 of a cutting process/operation using hole saw 10 of FIGS. 1-6 according to the present disclosure; FIGS. 8A-8C are diagrams illustrating hole saw 10 of FIG. 1-6 attached to an oscillating drive device 60 and performing the cutting process/operation depicted in FIGS. 7A-7C; and FIG. 9 is a diagram illustrating a hole or opening 70 formed in structure 50 using hole saw 10 of FIGS. 1-6 resulting from the cutting process/operation depicted in FIGS. 7A-7C and 8A-8C according to the present disclosure. In operation, hole saw 10 is placed against structure 50. For example, with hole saw 10 connected to drive device 60, medial locations 40 of sawing portions 24 are initially in contact with the structure 50. As force is applied to hole saw 10 toward the structure 50, teeth 28 begin cutting into the structure 50 in the region of medial locations 40. For example, FIG. 7A is a diagram depicting a surface of structure 50 during an initial phase of the sawing process where teeth 28 have formed initial cuttings or cut paths 52 into the structure 50. With the oscillating drive device 60, hole saw 10 is generally subject to vibrational and/or rotational movement relative to the structure 50. For example, an oscillating drive tool may produce 2°-4° of rotational movement in direction 54 relative to an axis 56. However, at medial locations 40, the rotational movement is substantially tangential to the longitudinal cutting direction of a respective sawing portion 24, thereby essentially producing a linear and/or non-rotational cutting path 52 into the structure 50.

As the cutting process continues and continued force is applied to hole saw 10 toward the structure 50, further portions of teeth 28 located distally from medial locations 40 begin to contact and cut into the structure 50. For example, FIG. 7B is a diagram illustrating the structure after further cutting with hole saw 10 such that the length of cuttings 52 have increased due to additional cutting teeth 28 distal from medial locations 40 coming into contact with the structure 50. Because portions of sawing portion 24 extending distally from medial location 40 become or are separated from stabilizing portion 22, such portions of sawing portion 24 are free to flex and move relative to the medial location 40 (e.g., the distal portions may move laterally/transversely relative to a respective cutting direction of the respective saw blade 20). Thus, in operation, as hole saw 10 moves into the structure, even though the hole saw 10 is being rotationally moved/driven, flexible and/or distal portions of the sawing portions 24 follow the initially formed cuttings 52 which are formed in in a longitudinal direction aligned with the respective blade members 20 due to the flexibility of the distal portions of the cutting portions 24. Thus, as hole saw 10 continues to move inward and cut into the structure 50, further portions of cutting portions 24 toward distal ends 30 cut into the structure and follow the previously formed cuttings 52, as depicted in FIG. 7C. Thus, despite the oscillating and/or rotational movement of the hole saw 10 in general relative to the structure 50 (e.g., from drive device 60), the flexible portions of the cutting portions 24 located distal to medial locations 40 enable such cutting portions 24 to flex to follow the previously formed cuttings 52 and create such cuttings 52 corresponding to the overall size and/or shape formed by the blade members 20. Accordingly, in operation, the cutting portions 24 of the hole saw 10 enable rotational movement of the hole saw 10 in general to be changed and/or translated into a linear cutting motion corresponding to the longitudinal direction of each respective blade member 20.

Thus, in operation, as the distance from the medial location 40 of the cutting portions 24 toward distal ends 30 increases, the sawing portion 24 becomes increasingly flexible to enable those distal portions of the blade members 20 to flex and follow the earlier formed cutting paths 52 even though the hole saw is being oscillated/rotated relative to the structure. Generally, forming blade members 20 as described herein enables the rotational movement of hole saw 10 to be translated into a linear cutting motion corresponding to the shape/design of the respective blade member 20.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A hole saw, comprising:
    a planar base member configured to secure the hole saw to a drive device; and
    a plurality of blade members, each blade member extending orthogonally from a respective side of the base member, each blade member having cutting teeth extending in a longitudinal cutting direction of the respective blade member, each blade member attached to the base member in a fixed position relative to the base member, each blade member having oppositely extending, freestanding distal ends, wherein each blade member is configured to have the respective distal ends of the respective blade member flex transversely to the longitudinal cutting direction of the respective blade member, and wherein an edge of each blade member having the respective cutting teeth extends linearly downward toward the base member as the edge extends toward the respective distal ends, and wherein a first one of the blade members is located orthogonal to a second one of the blade members; and wherein responsive to rotational movement of the hole saw via the drive device against a structure, a medial location of each blade member creates an initial respective linear cutting path into the structure, and wherein responsive to further movement of the respective blade members into the structure, the distal ends of the respective blade members flex transversely to the longitudinal cutting direction to follow the initial linear cutting path of the respective blade member despite the rotational movement of the hole saw relative to the structure to produce a respective linear cut through the structure corresponding to a length of the respective blade member in the longitudinal cutting direction of the respective blade member.

2. The hole saw of claim 1, wherein each of the blade members includes:
   a sawing portion having the respective cutting teeth extending in the respective longitudinal cutting direction between the respective distal ends to a respective first dimension;
   a stabilizer connected to the base member and extending in the respective longitudinal cutting direction to the respective first dimension; and
   an extender connecting the respective sawing portion to the respective stabilizer.

3. The hole saw of claim 1, wherein each blade member is connected to the base member via a respective extender, each respective extender having a respective dimension less than the length of the respective blade member.

4. A hole saw, comprising:
   a base member; and
   a set of blade members disposed orthogonally to the base member, each blade member attached to the base member in a fixed position relative to the base member, each blade member extending in a respective longitudinal direction to a respective cutting length, each blade member having an edge with cutting teeth, each blade member having oppositely disposed distal ends, and wherein the distal ends of each blade member are disconnected from the distal ends of another blade member of the set and are configured to flex transversely relative to the respective longitudinal direction of the respective blade member, and wherein the base member is configured to be coupled to a drive device, wherein at least one of the blade members is located orthogonal to at least one other of the blade members, and wherein each blade member includes:
      a stabilizer extending along a length of a respective side of the base member; and
      an extender extending from the stabilizer toward the cutting teeth of the respective blade member, the extender having a length in the respective longitudinal direction of the respective blade member less than the respective cutting length.

5. The hole saw of claim 4, wherein the edge of each respective blade member is arcuately-shaped.

6. The hole saw of claim 4, wherein the stabilizer of each blade member extends to the cutting length of the respective blade member.

7. The hole saw of claim 4, wherein the distal ends of each blade member are located adjacent to and spaced apart from the respective stabilizer.

8. The hole saw of claim 4, wherein a distance between the cutting teeth and the base member at a medial location of each respective blade member is greater than at the distal ends of the respective blade member.

* * * * *